Figure 1:
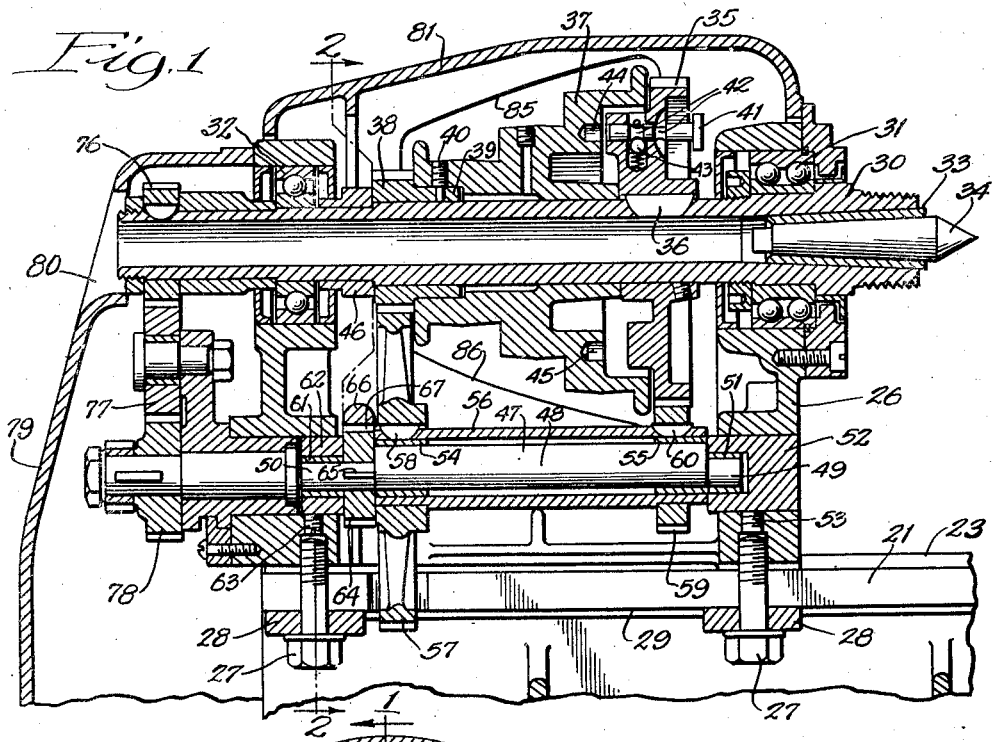

Jan. 11, 1944.   H. H. LOGAN ET AL   2,338,860

HEADSTOCK FOR LATHES

Filed Dec. 12, 1940

Inventors:
Henry H. Logan and
Oscar W. Littiedahl,
By McCaleb and Hendl
Attorneys.

Patented Jan. 11, 1944

2,338,860

UNITED STATES PATENT OFFICE 2,338,860

HEADSTOCK FOR LATHES

Henry H. Logan and Oscar W. Lilliedahl, Chicago, Ill., assignors to Logan Engineering Co., Chicago, Ill., a corporation of Illinois Application December 12, 1940, Serial No. 369,724

8 Claims. (Cl. 82—28)

The present invention relates to a lathe headstock and is particularly concerned with the manipulation of back-gearing which is enclosed with other operative parts of the headstock in a combined headstock frame and gear box.

In the design of modern lathes, it is important, particularly from a sales standpoint, that the contours of the machine be smooth flowing and well proportioned, since there is an increasing tendency on the part of purchasers to give consideration to appearance in addition to performance in the purchase of new equipment. For this reason, the enclosing of operating mechanisms in attractive housings to conceal the actual mechanical elements becomes increasingly important.

One of the objects of the invention is the provision of an improved back-gear operating arrangement for lathe headstocks.

Another object is to operate a lathe headstock back-gear arrangement without the use of unwieldy projecting operating devices.

Another object is to incorporate a back-gear operating device within the headstock mechanism of a lathe to facilitate the operation of said device.

Another object is to arrange a back-gear operating device on a lathe for greater convenience on the part of an operator.

Another object of the invention is to operate the back-gear arrangement of a lathe headstock by means of a straight line device projecting from a lathe headstock in a plane at right angles to the axis of a lathe spindle and of securing such a device in an operated position.

Other objects and advantages of the invention will be apparent from the following description and the accompanying drawing, in which similar characters of reference indicate similar parts throughout the several views.

Figure 2:
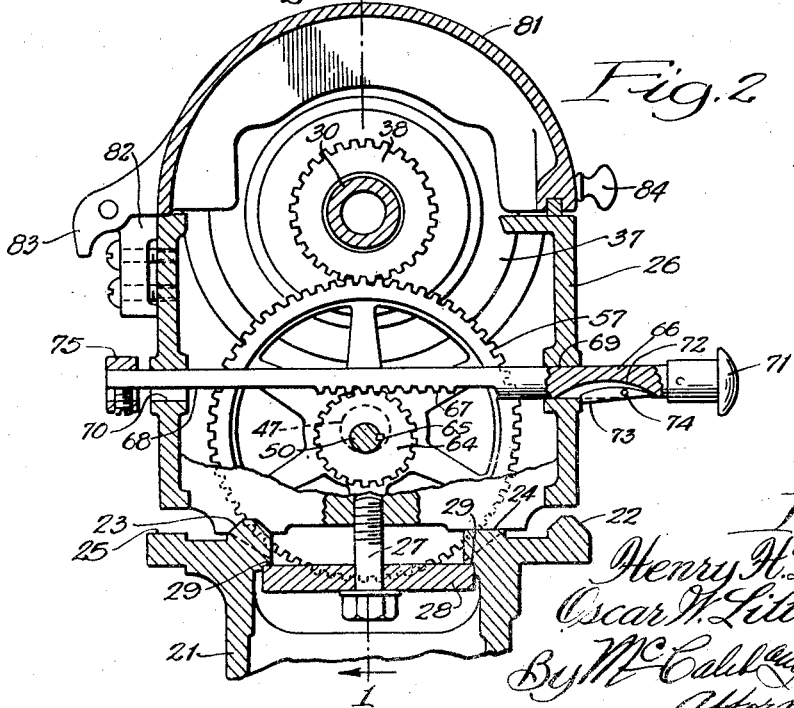

Referring to the drawing, of which there is one sheet:

Fig. 1 is a fragmentary vertical longitudinal sectional view through a lathe headstock and associated parts taken on the plane of the line 1—1 of Fig. 2; and Fig. 2 is a vertical transverse sectional view taken on the offset planes of the irregular line 2—2 of Fig. 1, a back-gear operating mechanism, constructed according to the invention, being embodied in the illustrated construction.

In the drawing, a lathe bed 21 is of conventional type having V-ways 22 and 23 and flat ways 24 and 25. A combined enclosure and headstock frame 26, which may be an iron casting, is supported upon the bed 21 in a conventional manner and is firmly secured thereto by means of bolts 27 and plates 28, the bolts being threaded into the bottom of the frame 26 to draw the plates 28 tightly into engagement with grooves 29 in the bed 21.

A spindle 30 is rotatably mounted in the frame 26, the right-hand or inner end thereof being mounted in a double row ball bearing 31 while the left-hand or outer end of the spindle is mounted in a single row ball bearing 32.

As illustrated in Figure 1, a conventional tapered sleeve 33 is inserted in the spindle and a conventional lathe center 34 is inserted in the sleeve 33. A gear 35 is secured to the spindle 30 as by means of a Woodruff key 36 being mounted adjacent a step pulley 37 which is journaled on the spindle 30.

A pinion 38 is also journaled on the spindle 30 and has a hub portion 39 fitted into a recess in the step pulley 37 and is secured to the step pulley by means of a pin 40 which is threaded in the step pulley and is provided with a reduced unthreaded extension which enters an opening in the hub 39.

A lock pin 41 is mounted for slidable movement in an opening in the gear 35 and is formed with two annular grooves 42 to be engaged by a spring-pressed ball 43 to hold the pin in either an outward or inward position. A pair of drilled recesses 44 and 45 are provided in the face of the step pulley to register with the pin 41 so that with the pin in its outer position as illustrated in Figure 1, the step pulley will rotate freely with respect to the gear 35. With the pin 41 pressed inwardly, to enter either of the openings 44 or 45, the gear 35 will be locked thereby to the step pulley 37.

A collar 46 is mounted on a reduced portion of the spindle to abut at one end against the pinion 38 and at the other end against the ball bearing 32 to prevent endwise movement of the step pulley 37 and the pinion 38 on the spindle 30.

A rock shaft 47 is made with a cylindrical central portion 48 and a pair of eccentric end portions 49 and 50, the end portions being in axial alignment with each other and smaller in diameter than the central portion 48. The eccentric end portion 49 is journaled in a bronze bearing 51 carried in a recess in a plug 52 which is secured in an opening in the frame 26 by means of a set screw 53.

The enlarged cylindrical portion 48 of the rock shaft has a pair of bushings 54 and 55 mounted one on each end thereof, and journaled on these bushings is a sleeve 56. The sleeve 56 has a back-gear 57 secured to one end thereof by means of a Woodruff key 58 and a back pinion 59 is similarly secured by a Woodruff key 60 to the other end of the sleeve 56.

The eccentric extension 50 of the rock shaft is journaled in a bronze bearing 61 mounted within a bushing 62 secured in an opening in the frame 26 by means of a set screw 63. An operating pinion 64 is secured to the eccentric extension 50 by means of a key 65.

A rod 66 has a rack 67 cut in the lower face thereof, the lower left-hand portion of the rod (as illustrated in Figure 2 which is toward the rear of the lathe) being cut away as at 68 for approximately half the thickness of the rod. The rod is mounted for free slidable movement in openings 69 and 70 in the front and rear walls respectively of the enclosing frame 26, with the rack portion 67 in meshed engagement with the rock shaft operating pinion 64.

A push-button type of knob 71 is secured to the forward end of the rod 66 to permit the rod to be grasped for manual operation. A recess 72 is formed in the lower face of the rod 66 and a pawl 73 is pivotally mounted within the recess on a pin 74, with the center of gravity of the pawl to the left of the pin, as illustrated in Figure 2, so that when the rod is drawn outwardly to the position of Figure 2, the pawl 73 will drop downwardly below the lower edge of the hole 69 to hold the rod against inward movement until the pawl 73 is again moved up into the recess 72. A collar 75 is secured to the rear end of the rack rod 66.

By drawing the rod outwardly to the position illustrated in Figure 2, the rack 67 rotates the pinion 64 with which it is in meshed engagement which rotates the rock shaft 47 to swing the central portion 48 thereof upwardly, bringing the back-gear 57 into meshed engagement with the driven pinion 38 and bringing the pinion 59 into meshed engagement with the spindle drive gear 35.

The pin 41 should be withdrawn to the position illustrated in Figure 1 when the back-gear arrangement is thus engaged, so that upon rotation of the step pulley 37, the driven pinion 38, being rotated, will in turn drive the back-gear 57, sleeve 56, back pinion 59, and spindle drive gear 35.

To move the back-gear arrangement to inactive position, the pawl 73 should be manually tilted upwardly from the position illustrated in Figure 2 to lie wholly within the recess 72 whereupon the knob 71 can be pushed inwardly, moving the rack 67 across the meshing pinion 64 and rotating the latter counterclockwise as seen in Fig. 2. This action of the pinion 64 swings the connected rock shaft 47 through a partial rotation of approximately 180 degrees to move the back-gear and back-pinion downwardly out of meshed engagement with the driven pinion 38 and spindle drive gear 35 respectively.

The mechanism at the left of Figure 1 comprises merely a conventional train of change-speed gears 76, 77 and 78, used to drive a conventional lead screw, not shown. Since these parts are all conventional and form no part of the present invention, they will not be described in detail.

A change-speed gear cover 79 is mounted to enclose the change-speed gear train and is provided with an opening 80 in alignment with the spindle to permit access to the hollow spindle as for instance for the purpose of inserting a conventional collet-chuck, or rod, not shown.

A top cover 81 is hinged to the rear side of the frame 26 by means of hinges 82. A projecting stop portion 83 is provided to limit the opening movement of the cover. A conventional knob 84 is provided on the front of the cover to provide a convenient means for its operation. The lower rear edge of the cover is arched upwardly as at 85 between the hinges 82 to register with a corresponding downwardly curved portion 86 of the rear wall of the frame 26 to provide an opening for a drive belt, not shown.

The present arrangement greatly facilitates operation of the back-gear rock shaft and brings its operating handle into a position which is more readily reached by the operator, as well as making for cleaner design and a more compact structure. The device is positively locked to maintain the back gear arrangement in an operating position, but can be readily released for moving the back gear arrangement to an inoperative position.

While we have illustrated a preferred embodiment of our invention, many modifications may be made without departing from the spirit of the invention and we do not wish to be limited to the precise details of construction set forth, but desire to avail ourselves of all changes within the scope of the appended claims.

Having thus described our invention, what we claim as new and desire to secure by Letters Patent of the United States is:

1. The combination with a lathe having a headstock frame, a spindle rotatably mounted therein, headstock gearing including a pair of connected back gears journaled on an eccentrically journaled rock shaft, and an enclosure at least partially enclosing said gearing including said back gearing, of a pinion secured to said rock shaft concentrically with its support, and a rack slidably mounted in said enclosure and in mesh with said pinion, said rack laterally extending frontwardly from said enclosure for straight line manipulation of said rock shaft.

2. The combination with a lathe having a headstock frame, a spindle rotatably mounted therein, and headstock gearing including a pair of connected back gears journaled on an eccentrically journaled rock shaft, of a pinion secured to said rock shaft concentrically with its support, and a rack slidably mounted on said frame and in mesh with said pinion, said rack laterally extending frontwardly from said pinion for straight line manipulation of said rock shaft.

3. The combination with a lathe having a headstock frame, a spindle rotatably mounted therein, headstock gears including a pair of connected back gears journaled on an eccentrically journaled rock shaft, of a pinion secured to such rock shaft concentrically with its support, a rack slidably mounted in said frame and in mesh with said pinion, said rack laterally extending frontwardly from said pinion, and locking means mounted releasably to lock said rack in operated position.

4. The combination with a lathe having a headstock frame, a spindle rotatably mounted therein, and headstock gearing including a pair of connected back gears journaled on an eccentrically journaled rock shaft; of an operating member secured to the rock shaft to project radially therefrom and pivoted concentrically therewith, a motion-translating member endwise slidably mounted intermediate the ends of said frame and having a portion thereof projecting beyond the frame, said motion-translating member being operatively connected to the rock shaft operating member to rock said rock shaft on an endwise slidable movement of said motion-translating member, and means for releasably locking said motion-translating member to retain said rock shaft in a position to which it has been rocked.

5. The combination with a lathe having a headstock frame, a spindle rotatably mounted therein, and headstock gearing including a pair of connected back gears journaled on an eccentrically journaled rock shaft; of an operating member secured to the rock shaft to project radially therefrom and pivoted concentrically therewith, a motion-translating member endwise slidably mounted intermediate the ends of said frame and having a portion thereof projecting beyond the frame, a push-pull operating handle mounted on the end of the portion of said motion-translating member projecting beyond the frame, said motion-translating member being operatively connected to the rock shaft operating member to rock said rock shaft on an endwise slidable movement of said motion-translating member, and means cooperative with the motion-translating member and the frame inwardly of the handle for releasably locking the motion-translating member to hold the rock shaft in one rocked position.

6. The combination with a lathe having a headstock frame, a spindle rotatably mounted therein, and headstock gearing, including a pair of connected back gears journaled on an eccentrically journaled rock shaft; of an operating member secured to the rock shaft to project radially therefrom and pivoted concentrically therewith, a motion-translating member endwise slidably mounted intermediate the ends of said frame and having a portion thereof projecting beyond the frame, a push-pull operating handle mounted on the end of the portion of said motion-translating member projecting beyond the frame, said motion-translating member being operatively connected to the rock shaft operating member to rock said rock shaft on an endwise slidable movement of said motion-translating member, and a lock pawl carried by said slidable motion-translating member and positioned lockingly to engage a frame element on an endwise slidable movement of said motion-translating member in one direction to rock said rock shaft to a predetermined position, said pawl being manually releasable to release said motion-translating member for endwise slidable rock shaft rocking movement in an opposite direction.

7. In combination with a lathe having a headstock frame providing a housing for a headstock spindle and transmission gearing including an arrangement of back gears, an eccentrically journaled rock shaft supporting the back gears, and means for rocking the shaft including an elongated member extending transversely across the rock shaft and interengaging means between the elongated member and the shaft for translating rectilinear motion of the elongated member into rotary motion of the shaft, the elongated member extending slidably through and being slidably guided by opposite sides of the housing and having a handle at the front end thereof outside of the housing for convenient manipulation to effect shaft-rocking rectilinear movement of the member.

8. In combination in a lathe including a headstock spindle and gearing therefor, said gearing including spindle-carried gears and back gears cooperative therewith journaled on an eccentrically journaled rock shaft, a housing for the spindle and gearing, and means for selectively rocking the rock shaft manually including an elongated member extending transversely across the rock shaft and projecting through the front of the housing, said elongated member being slidably guided by the housing to be pulled out for actuating said means to rock the shaft and effect meshing of the back gears with the spindle-mounted gears and to be pushed back for effecting reverse rocking of the shaft to unmesh the back gears from the spindle-mounted gears.

HENRY H. LOGAN.
OSCAR W. LILLIEDAHL.